(12) United States Patent
Arima et al.

(10) Patent No.: US 8,089,505 B2
(45) Date of Patent: Jan. 3, 2012

(54) TERMINAL APPARATUS, METHOD AND COMPUTER READABLE RECORDING MEDIUM

(75) Inventors: Yuuji Arima, Fukuoka (JP); Hideaki Nagao, Fukuoka (JP)

(73) Assignee: Panasonic Corporation, Osaka (JP)

(*) Notice: Subject to any disclaimer, the term of this patent is extended or adjusted under 35 U.S.C. 154(b) by 1392 days.

(21) Appl. No.: 11/622,640

(22) Filed: Jan. 12, 2007

(65) Prior Publication Data

US 2007/0165103 A1 Jul. 19, 2007

(30) Foreign Application Priority Data

Jan. 13, 2006 (JP) ................................ 2006-005909

(51) Int. Cl.
*H04N 7/14* (2006.01)
(52) U.S. Cl. ................ 348/14.07; 348/14.08; 348/14.12
(58) Field of Classification Search .... 348/14.01–14.16; 345/660, 672, 680, 671, 698, 472.2, 661
See application file for complete search history.

(56) References Cited

U.S. PATENT DOCUMENTS

| 6,396,507 | B1* | 5/2002 | Kaizuka et al. | 345/661 |
|---|---|---|---|---|
| 6,950,953 | B2 | 9/2005 | Kizawa et al. | |
| 7,124,201 | B2 | 10/2006 | Iyoki | |
| 7,155,522 | B2 | 12/2006 | Iyoki | |
| 7,202,878 | B2* | 4/2007 | Safadi et al. | 345/660 |

FOREIGN PATENT DOCUMENTS

| EP | 1016031 | 7/2000 |
|---|---|---|
| GB | 2395389 | 5/2004 |
| JP | 10-134079 | 5/1998 |
| JP | 2002-259077 | 9/2002 |
| WO | 98/44446 | 10/1998 |

* cited by examiner

Primary Examiner — Melur Ramakrishnaiah
(74) Attorney, Agent, or Firm — Greenblum & Bernstein, P.L.C.

(57) ABSTRACT

A terminal apparatus displays an enlarge-processed image based upon an image having predetermined resolution while an image having high resolution is acquired, and switches the displayed image to display an image having the high resolution when the acquiring operation of the image having the high resolution is accomplished. The terminal apparatus can performs display operations based upon a panning process operation and a tilting process operation in addition to the enlarging process operation.

12 Claims, 9 Drawing Sheets

TERMINAL APPARATUS, METHOD AND COMPUTER READABLE RECORDING MEDIUM

BACKGROUND

The present invention is related to a terminal apparatus for displaying an imaged obtained by a network camera, a method of controlling the terminal apparatus and a computer readable recoding medium.

Recently, image distributing apparatuses have been widely popularized which distribute images when these image distributing apparatuses are accessed via IP networks from a large number of terminal apparatuses. Among these image distributing apparatuses, network cameras on which camera apparatuses are mounted have been widely popularized. Network cameras transmit images imaged by these network cameras to the respective terminal apparatuses, and in a certain case, also transmit voice to these terminal apparatuses by using microphones and speakers, while Web servers are communicated via the IP networks with Web browsers of terminal apparatuses such as personal computers by using, for example, the protocol of HTTP.

In other words, when the Web browsers of the terminal apparatuses are connected via the IP networks such as the Internet, Ethernet (registered trademark), and the like to the network cameras, and then, the Web browsers request image data by using the HTTP protocol, the Web servers transmit display information described in languages such as HTML and XML to the terminal apparatuses. For instance, in the case that a communication operation is carried out by utilizing "Active X" of Microsoft Corporation, a Web browser of a terminal apparatus initiates an image viewer control of "Active X" in accordance with this display information, and then, image data transmitted from a network camera is displayed on an image viewer. As image data transmitted at this time, there are image data of Motion JPEG and MPEG formats, still image data of JPEG format, and the like.

On the other hand, in such network camera systems, in order that images having high resolution of Motion JPEG and JPEG formats are acquired to be displayed on image viewers, lengthy time is required for transferring data on networks. As a result, there are many possibilities that users of terminal apparatuses who request the image acquisitions must wait for long time until these requested images are displayed on these image viewers. In particular, in the case of a moving picture of the Motion JPEG format, the moving picture is adversely influenced by traffic of the network, and thus, an image quality as the moving picture is also deteriorated. Also, even when a user can obtain an image having high resolution, the user may eventually receive useless data, and also, such data, only the partial data of which is required and the remaining data of which is not required, may increase loads of communication traffics.

Although moving pictures are not intended to be transmitted as explained in network cameras, a network print system has been proposed by which even when photographic objects are complex, sharp images of specific portions are obtained, and at the same time, loads of communication traffics are reduced (refer to patent publication 1). In the network print system described in the patent publication 1, in response to an operation input from a terminal apparatus of a user, a plurality of thumbnail images having first resolution are displayed with respect to this terminal apparatus, or a plurality of divided images having low resolution which are produced by dividing an original image by a predetermined frame are displayed thereon by a first display processor provided in a server. When the user selects one sheet of desirable image from either the plural thumbnail images or the plural divided images, such a selected image is transmitted in second resolution higher than the first resolution so as to be displayed, while the selected image is obtained by enlarging either the thumbnail image or the divided image by a second display processor similarly provided in the server.

When a plurality of either thumbnail images or divided images which are independent from each other are received in a high speed, and then, either one thumbnail image or one divided image is manipulated from the terminal apparatus, an original image is displayed instead of either the thumbnail image or the divided image.

As a result, even when the photographic object is complex, the sharp image of the specific portion can be obtained by way of the selection. Moreover, while the loads of the communication traffics can be reduced, and also, the workloads on the operations can be reduced, the image desired by the user can be edited, and then, the edited image can be outputted to such an output device as a printing apparatus.

Patent Publication 1: JP-A-2002-259077

As previously explained, in the conventional terminal apparatus, in order to display the image having the high resolution on the image viewer, the lengthy time is required. Moreover, there are some cases that the image quality of the moving picture is lowered due to the adverse influence caused by the communication conditions. Also, there is such a problem that the data which need not be eventually transmitted may increase the loads of the communication traffics.

As to this terminal point, in the network print system described in the above-explained patent publication 1, plural pieces of either the thumbnail images or the divided images, which own the low resolution, are firstly transmitted in the high speed. When one piece of either the received thumbnail image or the received divided image is manipulated, the original image is displayed. However, this technical idea is merely realized as follows: That is, in the server, the fixed original images are compress-processed by a plurality of fixed frames (areas) respectively in the low resolution, so that either the thumbnail images or the divided images are merely formed. However, this technical idea does not constitute such an idea of a network camera that an image located at an arbitrary position is freely and smoothly enlarged so as to perform a zooming operation.

Then, in the case of the network camera, not only the zooming operation, but also the panning operation and the tilting operation may cause a problem. That is, in the network print system described in the patent publication 1, anyone image of either the thumbnail images or the divided images is merely selected in each frame (area) unit however, in the network camera, the lens must be directed to an arbitrary direction and the user is necessarily required to view this direction. Moreover, the changes in the image produced in connection with this operation must be smoothed. In contrast thereto, in the network print system described in the patent publication 1, while the image is zoom-processed, both the panning operation and the tilting operation are not carried out. In view of this technical point, this network print system has no relationship with the network camera. In other words, the network print system merely selects either the thumbnail image or the divided image, which have been compress-processed in any one of the low resolution, and then, returns the selected image to the original image. It should be understood that such an operation for rotating the view angle of the network camera in the horizontal direction corresponds to a panning operation, whereas such an operation for rotating the view angle of the network camera in the vertical direction corresponds to a tilting operation in this case.

On the other hand, among network cameras, such network cameras capable of optically performing zooming operations, panning operations, and tilting operations are known. These mechanisms are complex and are made expensive. Moreover, since these network systems are operated in the mechanical manner, there are large possibilities that these mechanisms are brought into failure operations, and cumbersome maintenance thereof is also required. Accordingly, in order to popularize network cameras, such a system capable of smoothly performing the above-described zooming, panning, and tilting operations in lower cost by executing software has been desirably expected.

SUMMARY

As a consequence, the present invention has an object to provide a terminal apparatus capable of performing a zooming operation, while an image quality of a network camera is not deteriorated.

In order to solve the above object, the present invention comprises a terminal apparatus that, when an instruction is input for an enlargement of an image displayed on a screen of a display, enlarges an image having a predetermined resolution, and obtains from the network camera an image having a higher resolution than the predetermined resolution. The terminal apparatus displays on the screen of the display an image enlarged based on the image having the predetermined resolution when obtaining from the network camera the image having the higher resolution. The terminal apparatus, when the obtainment of the image having the higher resolution is completed, displays on the screen of the display an image enlarged based on the image having the higher resolution.

DETAILED DESCRIPTION

Embodiment 1

A description is made of a terminal apparatus according to an embodiment 1 of the present invention, and furthermore, a program used for this communication terminal apparatus. Then, a network camera of the embodiment 1 includes a remote controlled camera such as a monitoring camera.

Figure 1:
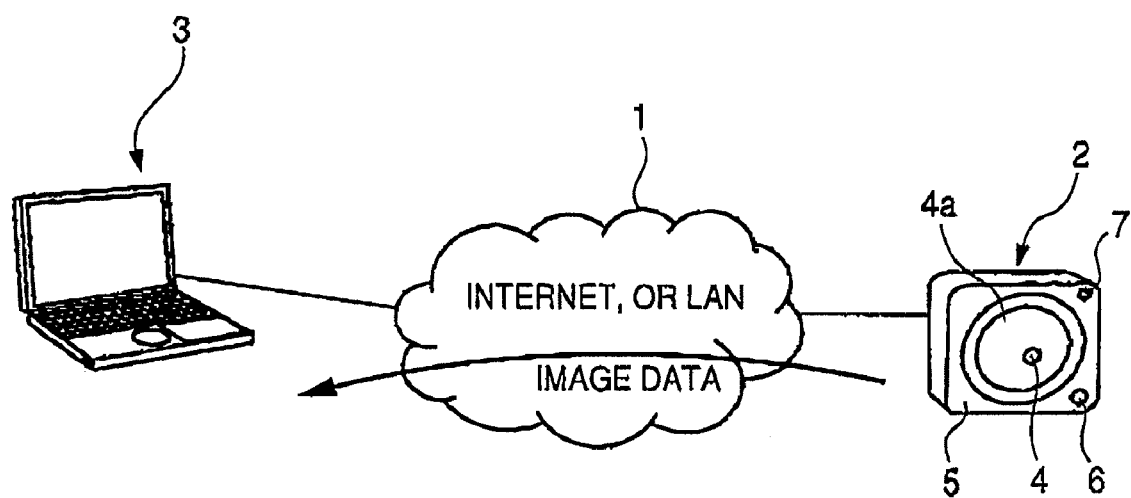
FIG. 1 is a network structural diagram of a network camera system according to an embodiment 1 of the present invention.
Figure 2:
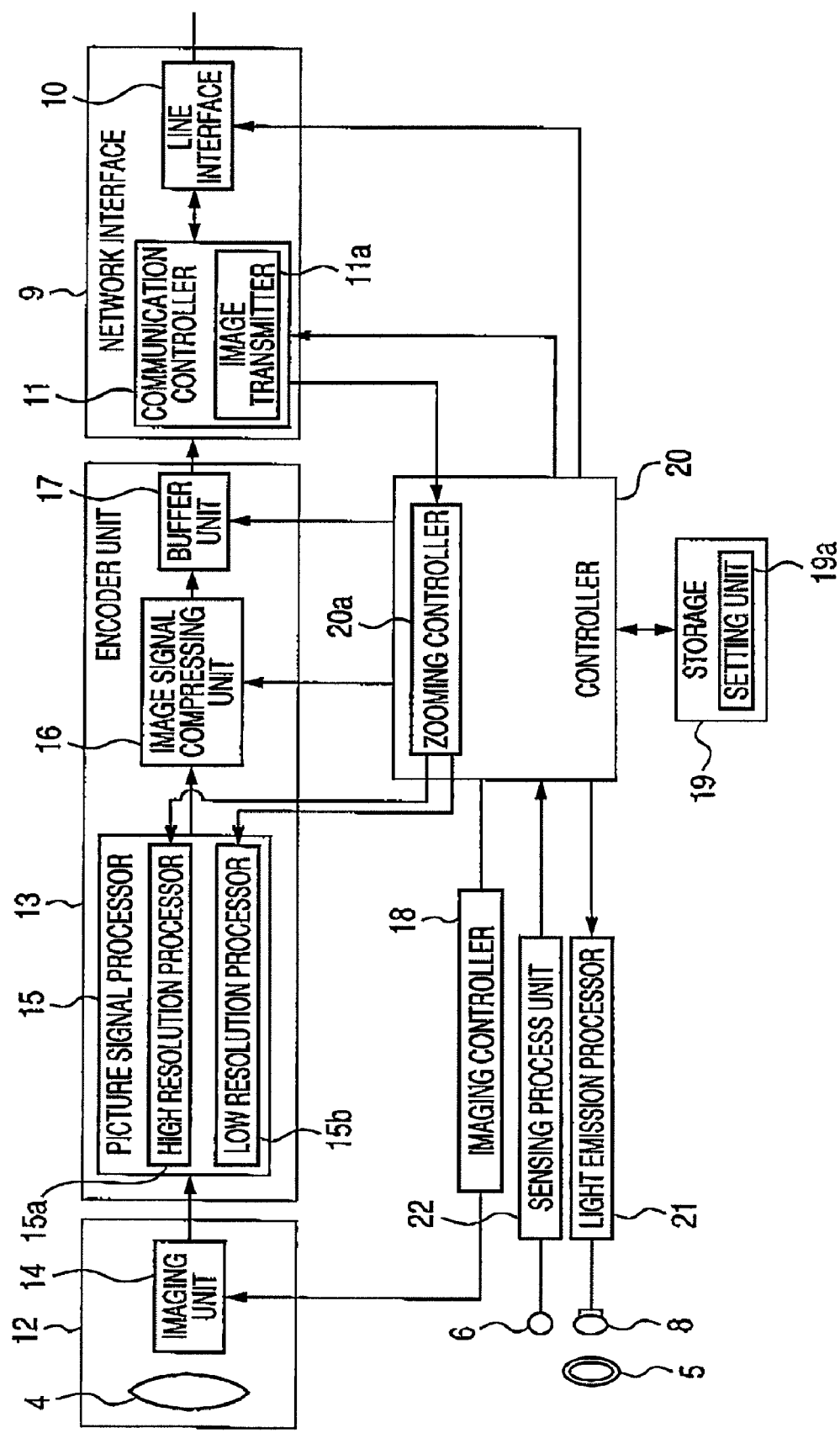
FIG. 2 is a structural diagram of a network camera in the embodiment 1 of the present invention.
Figure 3:
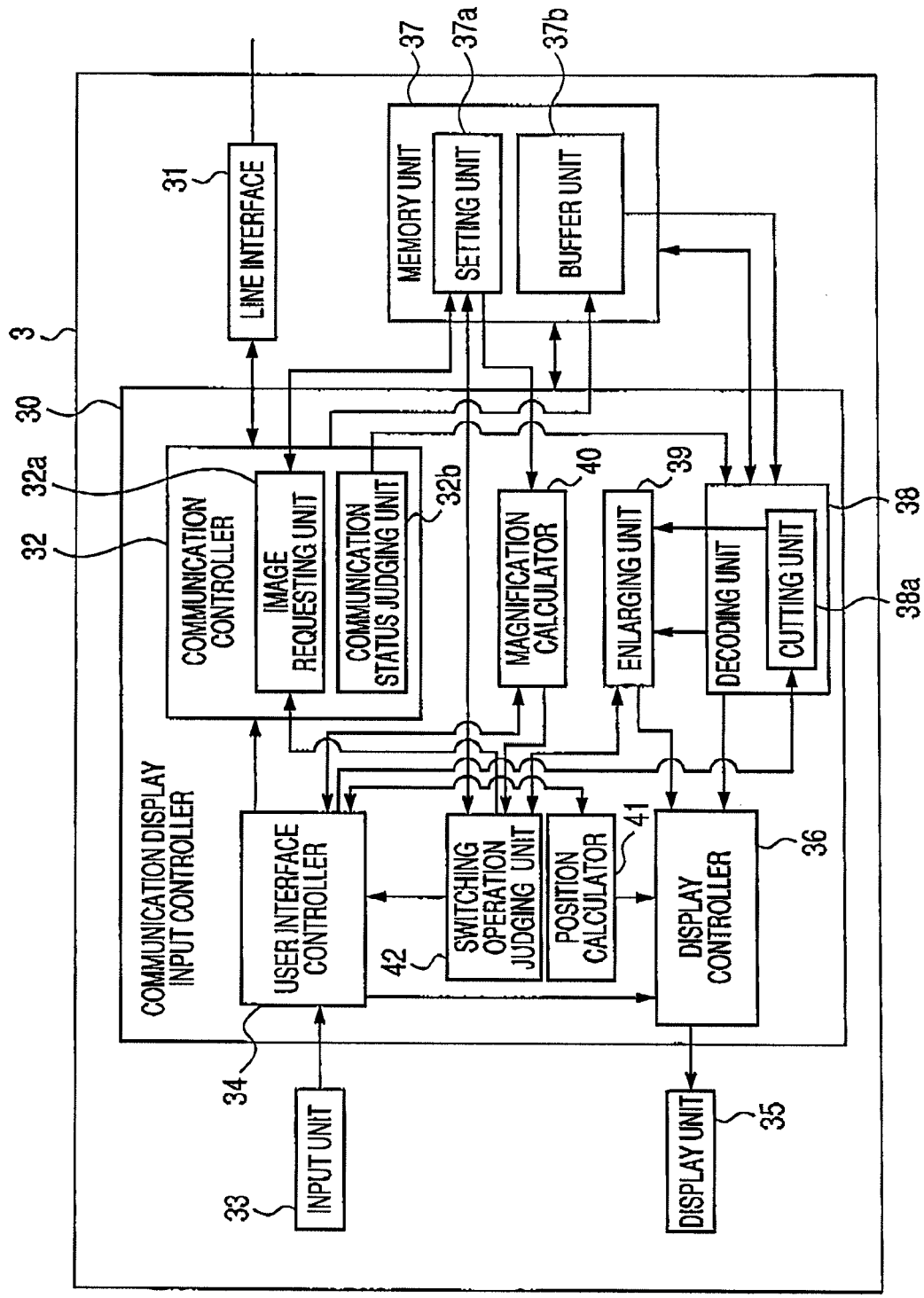
FIG. 3 is a structural diagram of a terminal apparatus according to the embodiment 1 of the present invention.
Figure 4:
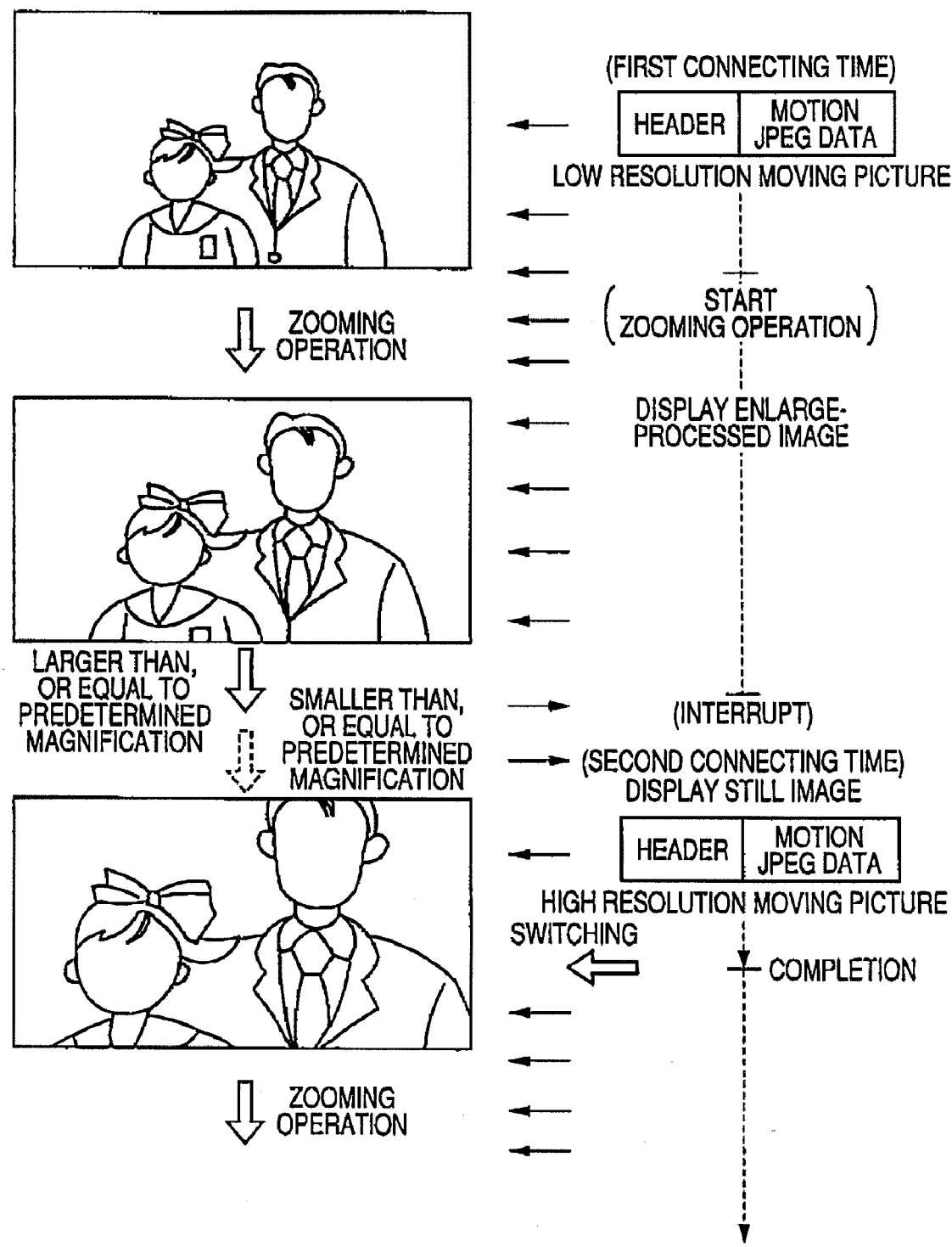
FIG. 4 is an explanatory diagram for explaining display changes of the terminal apparatus in the embodiment 1 of the present invention.
Figure 5:
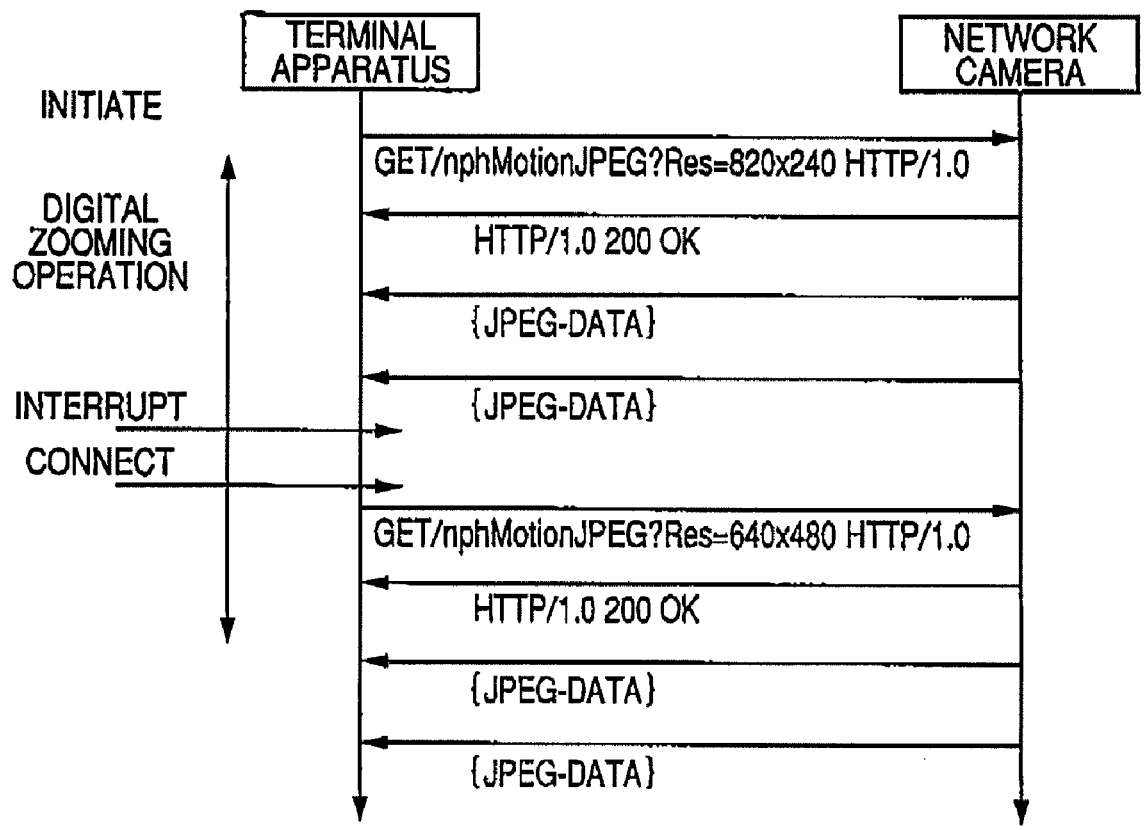
FIG. 5 is an explanatory diagram for explaining a sequential operation when the terminal apparatus according to the embodiment 1 of the present invention is connected to the network camera.
Figure 6:
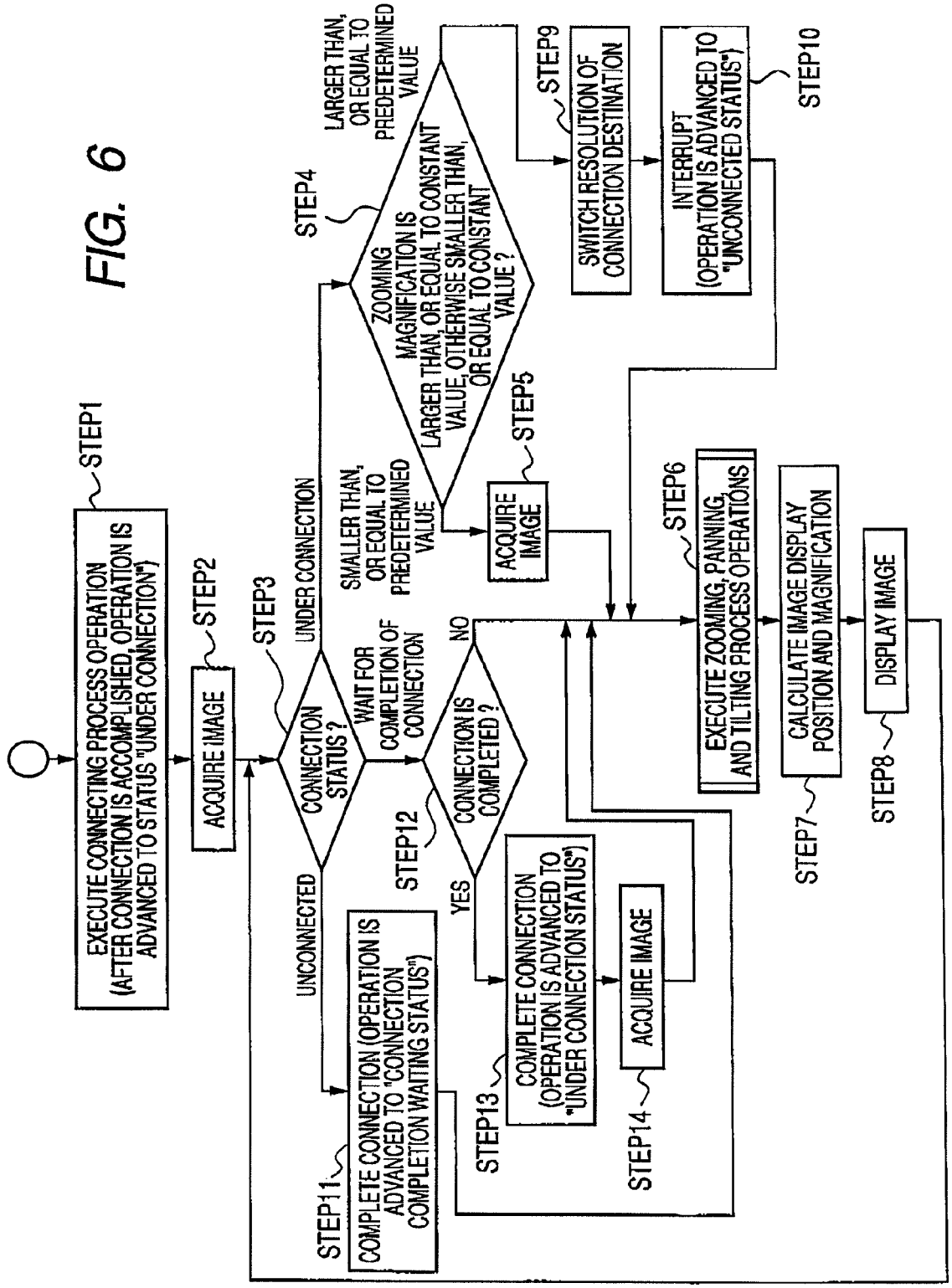
FIG. 6 is a flow chart for describing image display operations performed in the terminal apparatus according to the embodiment 1 of the present invention.
Figure 7:
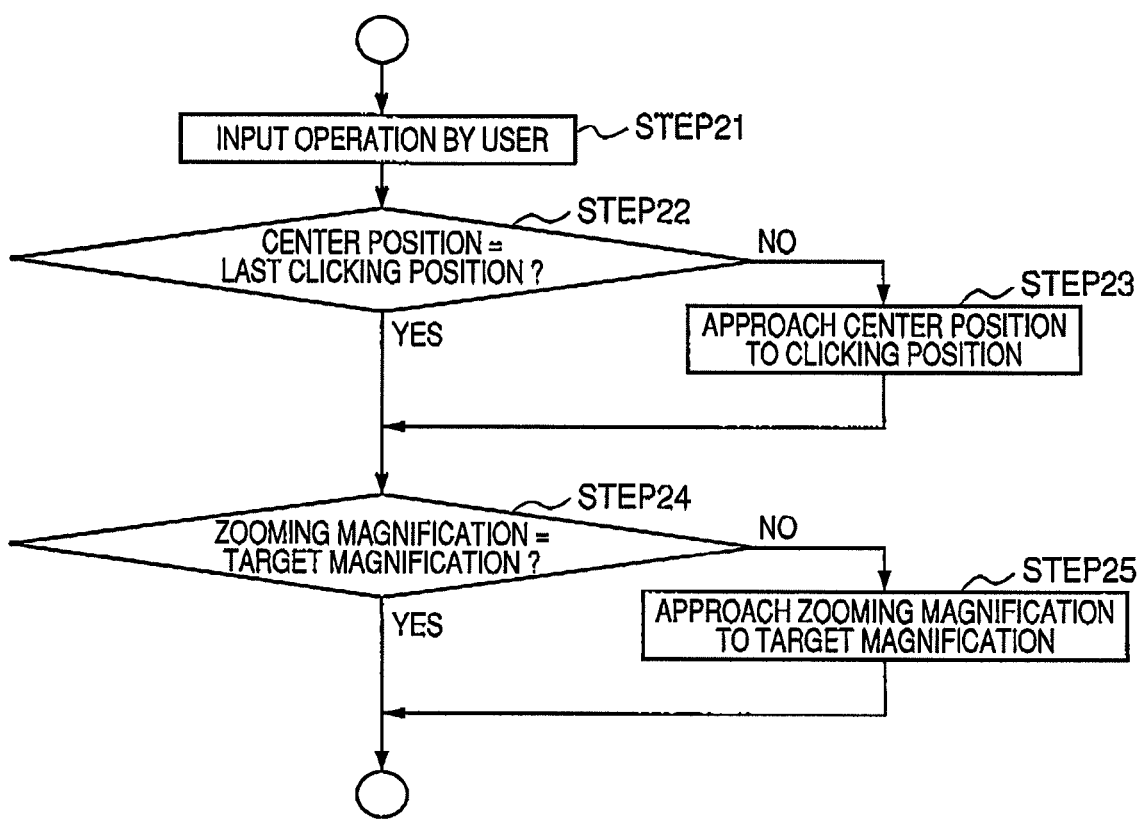
FIG. 7 is a flowchart for describing a zooming process operation, a panning process operation, and a tilting process operation, which are executed in the terminal apparatus according to the embodiment 1 of the present invention.
Figure 8:
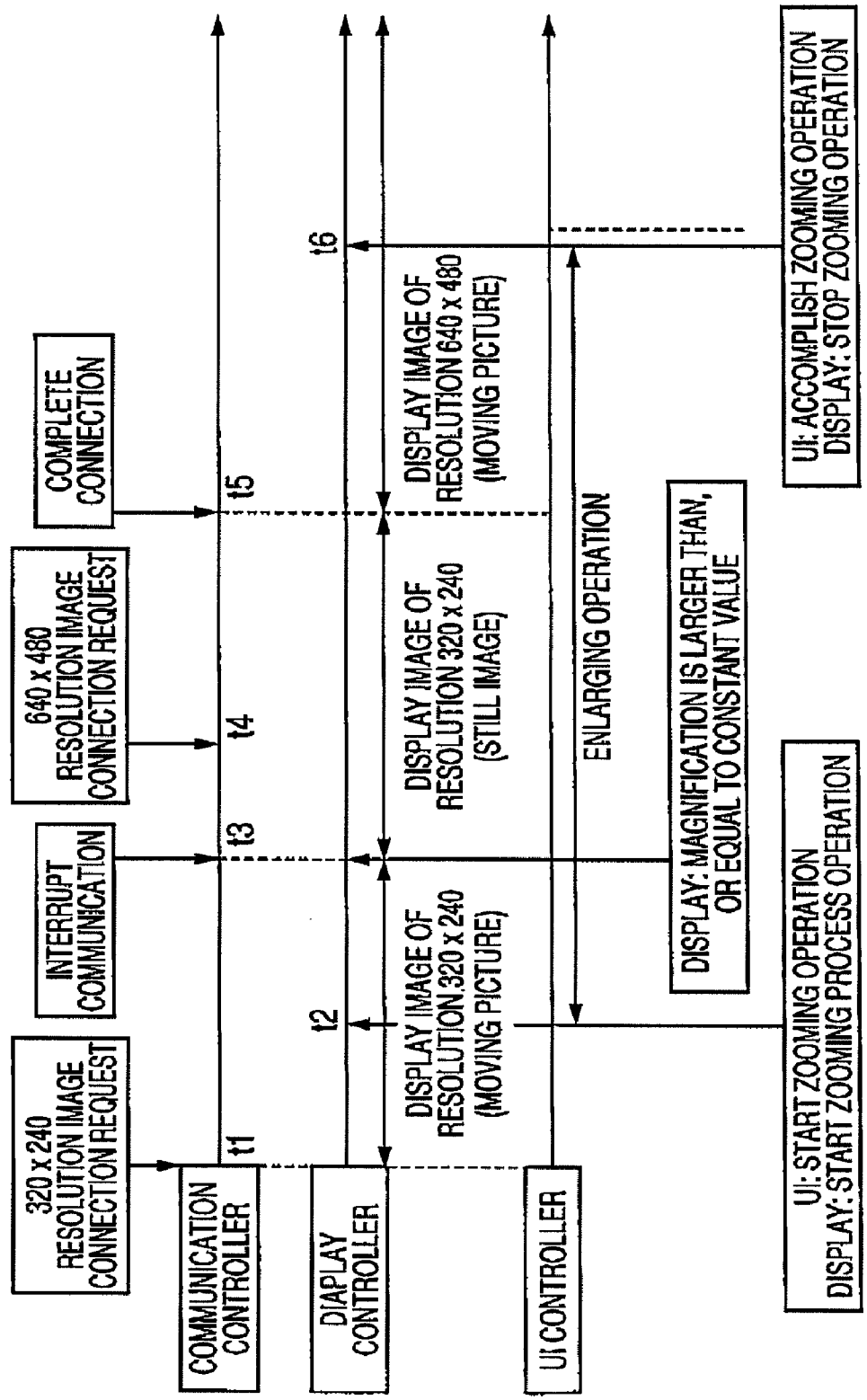
FIG. 8 is an explanatory diagram for explaining operations of respective controllers when the network camera is operated in a zooming mode by the terminal apparatus according to the embodiment 1 of the present invention.

FIG. 1 is a network structural diagram of a network camera system according to an embodiment 1 of the present invention. FIG. 2 is a structural diagram of a network camera in the embodiment 1 of the present invention. FIG. 3 is a structural diagram of a terminal apparatus according to the embodiment 1 of the present invention. FIG. 4 is an explanatory diagram for explaining display changes of the terminal apparatus in the embodiment 1 of the present invention. FIG. 5 is an explanatory diagram for explaining a sequential operation when the terminal apparatus according to the embodiment 1 of the present invention is connected to the network camera. FIG. 6 is a flow chart for describing image display operations performed in the terminal apparatus according to the embodiment 1 of the present invention. FIG. 7 is a flow chart for describing a zooming process operation, a panning process operation, and a tilting process operation, which are executed in the terminal apparatus according to the embodiment 1 of the present invention. FIG. 8 is an explanatory diagram for explaining operations of respective controllers when the network camera is operated in a zooming mode by the terminal apparatus according to the embodiment 1 of the present invention.

In FIG. 1, reference numeral 1 indicates an IP network (network of present invention) in which a communication operation is performed by using TCP/UDP and IP of the Internet, an intranet, and the like. Reference numeral 2 shows a network camera which records an image imaged by a camera unit 12 (will be explained later) and distributes the recorded image. Also, reference numeral 3 represents a terminal apparatus capable of accessing the network camera 2 via the IP network 1.

Reference numeral 4 shows an imaging lens, and reference numeral 4*a* represents a pan/tilt changing unit on which the imaging lens 4 is provided and which changes a panning operation and a tilting operation. It should be understood that in the embodiment 1, the pan/tilt changing unit 4*a* need not be mounted, and a detailed operation in the case that the pan/tilt changing unit 4*a* is utilized will be explained in an embodiment 2.

The imaging lens 4 is a focal point fixing type lens. Alternatively, the imaging lens 4 may be made of a lens movable to focused positions in order to perform an AF (Automatic Focusing) control. In this alternative case, an optical zooming operation may be carried out in addition to a digital zooming process operation (namely, enlarging process operation for image data by way of calculation, will be referred to as "zooming process operation" hereinafter) which will be explained later. Also, reference numeral 5 indicates a light conductor which conducts light emitted by an LED 8 (will be explained later) so as to emit light in a ring shape. The light conductor 5 has a large diameter in order that this light conductor 5 may be visually recognized even from a far point and is provided at a peripheral portion of the imaging lens 4. The light conductor 5 is made of such a resin as an ABS resin, an acrylic resin, or the like.

Reference numeral 6 shows a human sensitive sensor which senses thermal energy radiated from humans, animals, and the like. In the embodiment 1, as to the human sensitive sensor 6, a pyroelectric sensor has been employed as an infrared sensor. Reference numeral 7 indicates a power switch which turns ON/OFF a power supply (not shown). Also, reference numeral 8 represents an LED (Light Emitting Diode) which illuminates light onto the light conductor 5 so as to cause the light conductor 5 to emit light.

Subsequently, a description is made of an internal arrangement of the network camera 2 with reference to FIG. 2. In FIG. 2, reference numeral 9 shows a network interface (I/F) with respect to the IP network 1 of the network camera 2; reference numeral 10 represents a line interface (I/F) which perform a communication control operation of a lower grade layer, and reference numeral 11 represents a communication controller which performs a communication control operation by using a protocol of an upper grade layer such as the HTTP (Hypertext Transfer Protocol). Instead of the HTTP, a communication operation may be performed by using, for instance, the FTP (File Transfer Protocol), or the SMTP (Simple Mail Transfer Protocol). Also, reference numeral 11a indicates an image transmitter which is provided in the communication controller 11 and transmits image data of the Motion JPEG, the JPEG, or the like by using the HTTP, or the like. In the embodiment 1, the image transmitter 11a corresponds to a Web server in the case that image data is communicated by employing the HTTP. This Web sever 11a receives a request issued from a Web browser mounted on a communication controller 33 (will be explained later) of the terminal apparatus 3, and transmits image data recorded by the network camera 2.

Next, reference numeral 12 indicates a camera unit which mounts thereon the lens 4, and photoelectrically converts received light; and reference numeral 13 represents an encoding unit which encodes a signal outputted from the camera unit 12. In this camera unit 12, reference numeral 14 is an imaging unit which is constructed of a light receiving cell such as a CMOS type imaging cell and a CCD, and receives light which passes through the lens 4. Reference numeral 15 indicates a picture signal processor. The picture signal processor 15 processes R, G, B color signals, or complementary color signals, which correspond to output signals from the imaging unit 14, so as to produce a luminance signal "Y" and color difference signals "Cr" and "Cb", and then compresses these signals in accordance with the JPEG format, especially, the Motion JPEG format. In the picture signal processor 15, a contour correcting process operation, a gamma correcting process operation and the like are carried out.

In the embodiment 1, a function for switching resolution to output signals have been provided in the picture signal processor 15. That is, reference numeral 15a shows a high resolution processor which processes a signal outputted from the light receiving cell of the imaging unit 14 so as to output a signal having high resolution. Also, reference numeral 15b shows a low resolution processor which processes a signal outputted from the light receiving cell of the imaging unit 14 so as to output a signal having low resolution. It should also be noted that both the high resolution processor 15a and the low resolution processor 15b are not limited only to two resolution processor. In such a case that signals are outputted in plural stages of resolution, one, or more pieces of resolution processor are further provided. Also, in the case that the network camera 2 having the optical zooming function is used, an image having high resolution and an image having low resolution are acquired in an optical zooming process operation instead of the high resolution processor 15a and the low resolution processor 15b.

Also, reference numeral 16 is an image signal compressing unit which captures an output signal from the picture signal processor 15 at predetermined timing, and compresses the captured signal in accordance with the Motion JPEG format, or the like; and reference numeral 17 shows a buffer unit which temporarily stores thereinto image data produced in the image signal compressing unit 16 in combination with display information for an image display operation. The image signal compressing unit 16 quantizes an image signal which has been processed by way of, for example, a DCT process operation, and then encodes the quantized image data. The above-described display information for an image display operation is sizes and positions of pixels of a relevant area within an entire area of the respective pixels of the light receiving cell. Reference numeral 18 indicates an imaging controller which performs an electronic shutter control operation and an exposure time control operation with respect to the imaging unit 13. Reference numeral 19 shows a storage built in the network camera 2, which stores thereinto a control program and various sorts of data. Reference numeral 19a shows a setting unit which stores thereinto conditions of process operations when the high resolution processor 15a, the low resolution processor 15b, and the like perform process operations.

Also, reference numeral 20 indicates a controller by which a program is read in a CPU (Central Processor) functioning as hardware so as to achieve the various functions. Then, reference numeral 20a indicates a zooming controller which acquires images as follows: That is, when an image request message of the terminal apparatus 3 is received by the communication controller 11, the zooming controller 20a initiates the low resolution processor 15b in order to transmit an image having resolution designated by the request message, namely an image having predetermined low resolution in the beginning, and acquires the image having the low resolution, whereas when a zooming operation is performed in the terminal apparatus 3 so that the zooming magnification becomes larger than, or equal to a predetermined value, the zooming controller 20a initiates the high resolution processor 15a so as to acquire an image having high resolution. The zooming controller 20a is arranged by a CGI program which is initiated in response to a request message of an image.

Reference numeral 21 shows a sensing process unit. When the human sensing sensor 6 senses a human, the sensing process unit 21 amplifies a sensor signal outputted from this human sensitive sensor 6, and extracts only a frequency capable of sensing a human, and the like, and then, produces an interrupt signal with respect to the CPU which constitutes the controller 20 only for a signal having a predetermined frequency range. Also, reference numeral 22 represents a light emission processor which controls turning ON/OFF operations of the LED 8 so as to cause the light conductor 5 to emit light.

Next, a description is made of an internal arrangement of the terminal apparatus 3 based upon FIG. 3. In FIG. 3, reference numeral 30 shows a communication display input controller (first controller of embodiment 1 of present invention) of the terminal apparatus 3. For instance, the communication display input controller 30 corresponds to the controller on the side of the terminal apparatus 3 such as the Active X. Similar to the network camera 2, in the communication display input controller 30, a program is read in a CPU as the hardware so as to execute various functions, while the program is employed so as to perform an image communication operation, an image display operation, and an input control operation. It should be noted that the terminal apparatus 3 is constituted by a computer such as a personal computer.

Reference numeral 31 shows a line interface (I/F) which performs a communication control operation of a lower grade layer so as to connect the terminal apparatus 3 to the network camera 2; and reference numeral 32 represents a communication controller which performs a communication control operation by using a protocol of an upper grade layer such as the HTTP (Hypertext Transfer Protocol). Instead of the HTTP, a communication operation may be performed by using, for instance, the FTP (File Transfer Protocol), or the SMTP (Simple Mail Transfer Protocol). Also, reference numeral 32a indicates an image requesting unit which is provided in the communication controller 32 and transmits a request message as to image data of the Motion JPEG, the JPEG, or the like by using the HTTP, or the like. Reference numeral 32b shows a communication status judging unit which judges a connection status of the terminal apparatus 3 with respect to the network camera 2, for example, which judges a disconnection, under connection, and furthermore, judges as to whether or not all of image data have been completely received.

Reference numeral 33 indicates an input unit; reference numeral 34 shows a user interface controller which is provided in the communication display input controller 30, reference numeral 35 represents a display unit such as an LCD (liquid Crystal Display); and reference numeral 36 denotes a display controller (display unit of embodiment 1 of present invention) which is provided in the communication display input controller 30, and is capable of displaying an image and the like imaged by the network camera 2 on the display unit 35. The input unit 33 is constituted by a mouse, a keyboard, or the like, and performs two sorts of input instructions. As a first input instruction, the input unit 33 issues an input instruction of the user-interface controller 34, namely, when a panning operation and a tilting operation are carried out, this input unit 33 instructs a center position of an image display of the display unit 35, or instructs a center position of a partial image area within this image indication. As a second input instruction, when a zooming operation is performed, the input unit 33 instructs an enlargement, and furthermore, issues an input instruction of the user interface controller 34 as a device (second instruction function) for instructing an enlargement ratio thereof. The user interface controller 34 which executes the first instruction function corresponds to second and third instructing units of the embodiment 1 according to the present invention. The user interface controller 34 which executes the second instruction function corresponds to the first and fourth instructing units of the embodiment 1 according to the present invention.

Reference numeral 37 shows a memory unit which temporarily stores therein image data decoded by a decoding unit 38 (will be explained later) in order that the decoded image data is to be processed by an enlarging process operation. Reference numeral 37a indicates a setting unit to be used to store thereinto image display information, and initial values of respective control operations employed in the memory unit 37, while the image display information corresponds to parameters and size information, which are required in communications. Reference numeral 37b shows a buffer unit which obtains image data from a received packet to temporarily store the obtained image data.

Next, reference numeral 38 shows a decoding unit which obtains image data which has been compressed by way of the Motion JPEG format from the buffer unit 37b and then decodes the obtained image data. Then, reference numeral 38a represents a cutting unit (second controller of embodiment 1 according to present invention) which extracts either an image or an image area such as a rectangular area from the decoded image data, which are instructed via the user interface controller 34. Also, reference numeral 39 represents an enlarging unit which enlarge-processes the received image data having predetermined resolution, while the received image data is interpolated.

Also, reference numeral 40 indicates a magnification calculator which calculates magnification of an image based upon the image display information of the setting unit 37a and the enlargement instruction via the user interface controller 34; reference numeral 41 shows a position calculator which calculates a center position of an image, or a center position of an image area, which are inputted by using the user interface controller 34; and reference numeral 42 represents a switching operation judging unit which judges that an image of low resolution is switched to an image of high resolution. It should also be noted that the switching unit provided in the embodiment 1 of the present invention is arranged by this switching operation judging unit 42 and a user interface controller 34 which switches the resolution by receiving a judging result thereof. The first controller of the embodiment 1 according to the present invention is constituted by the enlarging unit 39, the image requesting unit 32a, the communication status judging unit 32b, the switching operation judging unit 42, and the user interface controller 34 which controls the above units so as to switch the resolution.

The magnification calculator 40 calculates magnification when an enlargement instruction is inputted from the input unit 33, and passes the calculation result to the switching operation judging unit 42. Then, this calculated magnification is compared with predetermined magnification (constant value) which has been set in the setting unit 37a for switching operations. When an enlargement ratio becomes larger than, or equal to this predetermined magnification, a communication operation for requiring an image having predetermined resolution under communication is once interrupted, and again, a request of an image having high resolution is again issued from the image requesting unit 32a of the terminal apparatus 3 to the network camera 2.

Also, the position calculator 41 calculates a center position of either an image or an image area in response to clicking of the input unit 33. The user interface controller 34 which has received this calculation result requests the cutting unit 38a to cut out image data of either the image or the image area based upon this calculation result and the setting information, and in the case that an enlarging process operation is required, the enlarging unit 39 performs the enlarging process operation based upon this image data. The image data which has been enlarge-processed, or the image data when the enlarging process operation is not required is directly transferred to the display controller 36 and then is displayed on the display unit 35.

Thus, a description is made of operations when an image display operation is carried out by the terminal apparatus 3 in the embodiment 1 based upon FIG. 4 and FIG. 5. As represented in FIG. 5, in order that an image is requested from the terminal apparatus 3 to the network camera 2, when a first request message such as "GET/nphMotionJPEG(questionmark)Res=320×240 HTTP/1.0" is sent to a URL of the network camera 2, and the CGI program "MotionJPEG" is initiated so as to request an image having predetermined resolution 320×240 pixels, the network camera 2 returns a packet of "HTTP/1.0 200 OK" in order to transmit JPEG data {JPEG-DATA}, so that the network camera 2 is connected to the terminal apparatus 3. It should also be understood that while this CGI program "MotionJPEG" constitutes the above-described zooming controller 20a, the CGI program "MotionJPEG" initiates the low resolution processor 15b which outputs data of low resolution in accordance with such a designated resolution as 320×240 pixels.

Thereafter, the network camera 2 under connection transmits the Motion JPEG type JPEG data {JPEG-DATA} of the imaged image to the terminal apparatus 3 by using a packet produced for every exposure time. The resolution of 320×240 pixels at this time corresponds to the predetermined resolution of the display in the beginning stage in the embodiment 1. An image represented in FIG. 4 is displayed as a moving picture based upon both "200OK" and the Motion JPEG type JPEG data {JPEG-DATA} stored in respective packets which are subsequently and continuously transmitted.

When a zooming operation is performed from the input unit 33 with respect to the image under display, the enlarging unit 39 enlarge-processes the image based upon such an image having the pixel of 320×240 pixels, and then, the enlarged image is displayed under control of the display controller 36. At the same time, the magnification calculator 40 calculates enlarge-processed magnification (namely, enlargement ratio of embodiment 1 of present invention), and the switching operation judging unit 42 judges as to whether or not switching of the resolution is required.

When the calculated magnification becomes larger than, or equal to the predetermined magnification, the switching operation judging unit 42 notifies a request of an image having high resolution to the image requesting unit 32a. Since the present communication status is judged as "under connection" by the communication status judging unit 32b, the communication operation is once interrupted by the communication controller 32, and the image requesting unit 32a transmits a second request message for requesting an image having high resolution such as "GET/nphMotionJPEG (question mark) Res=640×480 HTTP/1.0", in this case, for requesting an image having high resolution of 640×480 pixels.

Until the reception of the image having the high resolution with respect to the second request message is accomplished, the display controller 36 displays the enlarge processed still picture having the resolution of 320×240 pixels on the display unit 35. Thereafter, when the communication status judging unit 32b judges that the reception of the image having the required resolution is completed, the image data decoded by the decoding unit 38 is transferred to the display controller 36, and then, the still image under display is switched to the received image having the high resolution so as to display the switched image having the high resolution on the display unit 35. When the still image has been enlarge-processed to be displayed, the enlarge-processed image is displayed.

In the above-described example, the image having the resolution of 320×240 pixels is enlarged-processed, and then, the enlarged image is switched to the image having the resolution of 640×480 pixels. Alternatively, while resolution of 160×120 pixels is defined as the predetermined resolution, the image may be enlarge-processed in plural stages, for instance, two, or more higher stages, e.g., resolution of 320×240 pixels and resolution of 640×480 pixels. In this alternative case, since the enlargement ratio is subdivided into plural steps to be enlarged stages of the enlargement ratios for enlargements, enlarging process operations are carried out in resolution corresponding to each of the plural stages, so that calculation times required in the enlarging process operations may be reduced. Then, in such a case that an enlargement ratio at each of the plural stages is larger than a predetermined enlargement ratio, such an image having higher resolution than this resolution is received from the network camera 2 so as to enlarge-process the image. As a result, even when an image is enlarged in a large enlargement ratio, an image deterioration may be suppressed, and thus, an enlarged image having high resolution may be displayed. Also, in such a case that an enlargement ratio is smaller than the predetermined enlargement ratio (predetermined magnification), an image is acquired from the network camera 2 in either the predetermined resolution (320×240 pixels in embodiment 1) or such a resolution equivalent to the above-described predetermined resolution so as to be enlarge-processed, while the equivalent resolution is defined within a resolution range at least 1.0 to 1.5 times larger than the predetermined resolution of 320×240 pixels, since the next stage is the pixel of 640×480 pixels. As a result, the image data having the high resolution is no longer communicated between the network camera 2 and the terminal apparatus 3, so that the calculation time required in the enlarging process operation may be reduced.

On the other hand, similar to the above-described zooming operation, a panning operation and a tilting operation may be alternatively carried out by the input unit 33 with respect to an image under display. In other words, when a center position on an image is clicked, the position calculating unit 41 calculates the center position via the user interface controller 34, and the user interface controller 34 which has obtained this calculation result requests the cutting unit 38a to obtain such an image data corresponding to either a predetermined image or an image area based upon the above-described calculation result and the size information of the setting unit 37a. Then, in the case that the enlarging process operation is required, image data which has been enlarged (interpolated) by the enlarging unit 39 is displayed on the display unit 35 by the display controller 36, whereas in the case that the enlarging process operation is not required, this obtained image data is directly displayed thereon.

As a consequence, if a desirable position is instructed by the input unit 33, then while this designated position is defined as the center position of either the new image or the image area, the screen is moved, so that the image indication may be moved. As a consequence, even as to either an image or an image area having the same resolution of 320×240 pixels, either another image or an image area whose center positions are different from those of the first-mentioned image or image area are cut out by the cutting unit 38a, and even such a network camera 2 which does not own the panning function and the tilting function may pretend to be capable of performing a panning operation and a tilting operation. It should also be noted that the process operation executed by the cutting unit 38a does not correspond to the mechanical panning and tilting operations by the pan/tilt changing unit 4a, but corresponds to a process operation executed by software, namely may be referred to as a digital panning process operation and a digital tilting process operation. In the below-mentioned explanations, these digital panning process operation and digital tilting process operation will be referred to as a "panning process operation" and a "tilting process operation", respectively.

On the other hand, when a center position (center point of embodiment 1 of present invention) is displayed by the display controller 36, for example, a symbol of a red point is displayed based upon a calculation result of the position calculator 41, a center of a screen can be immediately grasped based upon this displayed center position. Moreover, either an image or an image area is displayed by the user interface controller 34 while this grasped position is located at the center thereof. As a result, either the image or the image area is displayed at the center of the screen, and the enlarged-processed entire image may be easily viewed. However, depending upon a designated center position, there are some cases that a predetermined rectangular area used as a center cannot be disposed within the display area of the display unit 35. As a consequence, the user interface controller 34 moves the display of the center position with such a range that the predetermined rectangular area is not deviated from the display area. In this case, since the position calculator 41 calculates a coordinate value of the center position and coordinate values of 4 corners based upon the size of the rectangular area, the user interface controller 34 may judge as to whether or not the rectangular area is deviated from the display area, and also, the display of the center position is moved.

When a rectangular area is deviated from the display area, further executions of the panning process operation and the tilting process operation are restricted. However, a zooming process operation may be performed with respect to an arbitrary portion within the rectangular are a disposed in the display area. If an arbitrary portion is delimited within the display area, then this arbitrary area may be firmly enlarged to display the enlarged image portion. It should also be noted that the user interface controller 34 may stop a panning process operation and a tilting process operation just before the rectangular area is deviated from the display area, and thereafter, even if the user performs a panning operation and a tilting operation, then the user interface controller 34 may perform that the image indication is not moved on the screen. Alternatively, even if a partial image portion may be displayed, then such an image that the area of the deviated portion remains non-displayed may be continuously displayed (refer to FIG. 9(b)). In other words, either the entire image or the partial image of the rectangular area may be displayed.

A description is made of sequential operations for displaying images, and also, sequential operations of a program for controlling a computer to execute the image display sequential operations, which are executed in the terminal apparatus 3 by the network camera 2 with reference to a flow chart shown in FIG. 6. In FIG. 6, a connecting process operation for requesting an image is performed from the terminal apparatus 3 to the URL of the network camera 2 (step 1) so as to acquire an image having predetermined resolution (step 2). A communication status at this time is judged (step 3). Since the communication status is under connection, a judgement is made as to whether or not zooming magnification is larger than the predetermined magnification, otherwise is smaller than, or equal to the predetermined magnification (step 4). In the case that the zooming magnification is smaller than, or equal to the predetermined magnification, the image is continuously acquired (step 5).

A zooming process operation, a panning process operation, and a tilting process operation are carried out with respect to this acquired image (step 6); a display position of the image is calculated by the position calculator 41; and magnification is calculated by the magnification calculator 40 (step 7). In the step 6, when the zooming process operation is carried out, the zoom-processed image is displayed on the display unit 5, whereas when the panning process operation and the tilting process operation are carried out, the cut image is displayed on the display unit 35 (step 8).

In the step 4, when the zooming magnification is larger than the predetermined, the switching operation judging unit 42 requests switching of resolution (step 9), and the communication controller 32 once interrupts the communication operation (step 10). Thereafter, while the process operations of the steps 6 and 7 are not carried out, a still image having the predetermined magnification is displayed in the step 8.

Thereafter, the process operation is returned to the previous step 3 in which a communication status is judged. Since the communication operation is interrupted and thus is under non-connection condition, the image requesting unit 32a again performs a connecting process operation (step 11). However, since the image requesting unit 32a merely performs the connecting process operation, the process operations of the steps 6 and 7 are not carried out, but the still image having the magnification under display is continuously displayed in the step 8.

Furthermore, the process operation is returned to the step 3 in which a communication status is judged. If it is so judged that a completion of a connecting operation is waited, then the communication status judging unit 32b checks as to whether or not the connecting operation is completed (step 12). If the communication status judging unit 32b judges that the connecting operation is not yet completed, then the displaying operation of the still image under display is continued in the step 8 while the process operations of the steps 6 and 7 are not carried out. Thereafter, when the communication status judging unit 32b judges that the connecting operation is completed in the step 12, the connecting operation is accomplished (step 13), and then, an image having high resolution is acquired (step 14), and also, in the step 8, the still image under display is switched by this acquired image having the high resolution to display the switched image having the high resolution on the display unit 35, while the process operations of the steps 6 and 7 are not executed.

Thereafter, the process operation is again returned to the step 3 in which the process operation under connection of the step 4 is carried out, and any one of the process operations defined in the step 11, the step 12, and the step 4 is carried out in response to the zooming process operation, the panning process operation, and the tilting process operation.

Next, an explanation is made of a flow chart for explaining a zooming process operation, a panning process operation, and a tilting process operation, which are carried out by the terminal apparatus 3 according to the embodiment 1. In the flow chart of FIG. 7, when the user inputs instructions as to a zooming operation, a panning operation, and a tilting operation by manipulating a keyboard, a mouse, and the like (step 21), the user interface controller 34 controls the position calculator 41 so as to calculate a center position, and judges as to whether or not a click position which is finally inputted corresponds to the center position of the image based upon the calculation result (step 22). If the finally inputted click position does not correspond to the center position, then the user interface controller 34 moves an indication (for example, symbol of red point) of the center position is approached to the click position (step 23). If the finally inputted click position corresponds to the center position, then the process operation is directly unit 34 moved to a next step. In the step 22, such a case that the click position constitutes the center position of the image implies such an input that the image is merely panned and tilted.

Next, the user interface controller 34 controls the magnification calculator 44 to calculate present zooming magnification, and if the calculation result is obtained, then the user interface controller 34 judges as to whether or not the present zooming magnification corresponds to target magnification entered by the zooming operation (step 24). In the case that the present zooming magnification is not the target magnification entered by the zooming operation, the user interface controller 34 controls the enlarging unit 39 to perform a zooming operation in such a manner that the present zooming magnification is approached to the target magnification (step 25). When the present zooming magnification becomes equal to the target magnification in the steps 24 and 25, the zooming process operation, the panning process operation, and the tilting process operation are accomplished.

As previously explained, in accordance with the embodiment 1, the indication of the center position is moved within such a range that the image area where the center position designated by the input unit 33 is located at the center, for instance, the rectangular area is disposed within the display area of the display unit 35. As a result, the panning process operation and the tilting process operation can be readily carried out within the display area of the image imaged by the network camera 2. Moreover, in the case that the zooming process operation is performed within this area, such an image that the arbitrary image portion is enlarged can be firmly displayed.

Also, the image area at the desirable position (namely, position where panning operation, or tilting operation is carried out) cut out by the cutting unit 38a is enlarge-processed based upon the predetermined resolution so as to be zoom-processed. Then, when the acquisition of the image having the high resolution is accomplished, this image having the high resolution is switched by the image which is enlarge-processed based upon the image having the high resolution while the indication of the center position is located at the center. As a result, the zooming operation, the panning operation, and the tilting operation can be carried out while the user need not be brought into the waiting condition, but also the process operations are not interrupted in appearance.

Operations and timing of the respective controllers when the network camera 2 is operated in the above-explained zooming mode by the terminal apparatus 3 will now be explained with reference to FIG. 8.

When the communication controller 32 issues a connection request to the network camera 2 at time "t1" while requesting image data having the predetermined resolution of 320×240 pixels, the image data having resolution of 320×240 pixels is transmitted within a short time, and then, the display controller 36 displays a moving picture having the resolution of 320×240 pixels. The communication controller 32 directly and continuously receives the image data, and the display controller 36 displays the received image data.

At time "t2", when the user commences the zooming operation by using the input unit 33, the user interface controller 34 controls the enlarging unit 39 to start an enlarging process operation, and the display controller 36 displays the zoom-processed image. If the user continues this zooming operation without performing any operation, then the zooming magnification becomes larger than, or equal to the predetermined magnification at time "t3." As a result, the communication controller 32 once interrupts the communication operation. At the same time, the display controller 36 displays either the last image or such a still image obtained by enlarge-processing this last image.

If the communication controller 32 requests image data having high resolution of 640×480 pixels and issues a connection request to the network camera 2 in time "t4", then the image data having the high resolution of 640×480 pixels is transmitted from the network camera 2. The display controller 36 continuously displays an enlarged image as to the finally acquired image until the connection is accomplished in time "t5."

When the connection is completed at time "t5", the user interface controller 34 switches the display of the zoom-processed still image to the display of the image (moving picture) having the high resolution of 640×480 pixels. Even under this condition, if the use continuously performs the zooming operation, then the display controller 36 zoom-processes the image having the high resolution, so that the display controller 36 displays the enlarge image. When the zooming operation performed by the user is ended at time "t6", the display controller 36 stops the zooming process operation.

As previously explained, in accordance with the terminal apparatus 3 and the network camera 2 of the embodiment 1, while the image having the high resolution is acquired, the enlarging process operation is continuously carried out based upon the image having the predetermined resolution so as to display the enlarged-process image; and when the acquisition of this image having the high resolution is accomplished, the displayed image is switched to the enlarged image obtained based upon the image having the high resolution so as to display this enlarged image. As a result, the enlarged image having the high resolution can be displayed within a short time while the user does not have a waiting feeling.

In the case that the enlargement ratio is larger than the predetermined enlargement ratio, the image having the resolution higher than the predetermined resolution is received from the network camera 2 and then the received image is enlarge-processed. As a result, even when the image is enlarged in the large enlargement ratio, the deterioration of the image can be suppressed, and this the enlarged image having the high resolution can be displayed. In the case that the enlargement ratio is smaller than the predetermined enlargement ratio, the image is acquired from the network camera 2 in the predetermined resolution and then the acquired image is enlarge-processed. As a result, the calculation time required in the enlarging process operation can be reduced. Also, if the enlargement ratio is subdivided into the plural stages and the divided enlargement ratio is designated, then the enlarging process operation is carried out in the corresponding resolution for each of these stages, so that the calculation time required in the enlarging process operation can be reduced.

Also, the image (namely, image continued to a portion of image under display) of such a portion which is located adjacent to the image indicated within the area of the image imaged by the network camera 2 is continuously displayed on the screen. As a result, even in such a network camera 2 which is not provided with the panning function and the tilting function, it is possible to pretend to operate this network camera 2 capable of performing the panning and tilting operations. Also, in this case, the enlarged image having the high resolution can be displayed while the user need not be brought into the waiting status. Since the center position of the enlargement is indicated as a predetermined symbol, the enlarged image is always displayed at the center of the screen, so that the entire enlarged image can be readily viewed.

Moreover, in accordance with the program of the embodiment 1, while the image having the high resolution is acquired, the enlarging process operation is continuously carried out based upon the image having the predetermined resolution so as to display the enlarged-process image, and the communication operation is once interrupted; and when the acquisition of this image having the high resolution is accomplished, the displayed image is switched to the enlarged image obtained based upon the image having the high resolution so as to display this enlarged image. As a result, the enlarged image having the high resolution can be displayed while the user does not have a waiting feeling.

Embodiment 2

Next, a description is made of a network camera 2 according to an embodiment 2 of the present invention. The embodiment 2 is featured by utilizing a panning operation and a tilting operation by the pan/tilt charging unit 4a in addition to the above-described panning process operation and tilting process operation of the embodiment 1. It should be understood that since an arrangement of the embodiment 2 is identical to the arrangement of the embodiment 1, the same reference numerals indicate the same structural elements, and therefore, explanations thereof are omitted in this embodiment 2. Also, in the embodiment 2, FIG. 1 to FIG. 8 are used as references.

Figure 9A:
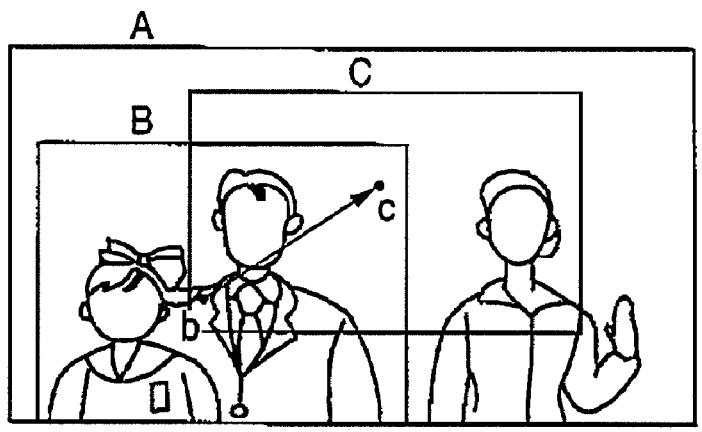
FIG. 9A is an explanatory diagram for explaining an image display in the case that an image area processed based upon the panning process operation and the tilting process operation of the terminal apparatus employed in the embodiment 2 of the present invention is disposed within a display area.
Figure 9B:
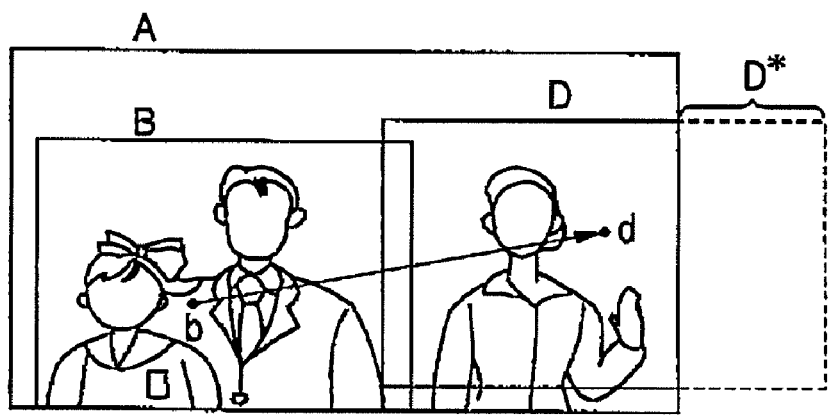
FIG. 9B is an explanatory diagram for explaining an image display in the case that the image area processed based upon the panning process operation and the tilting process operation of FIG. 9A is not disposed within the display area.
Figure 9C:
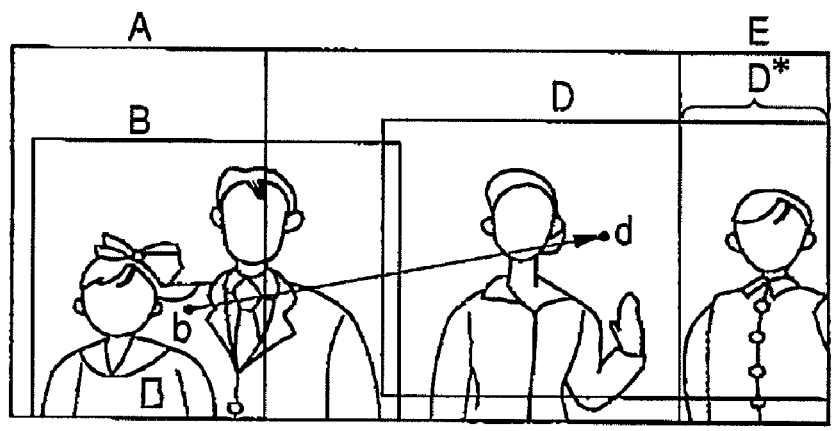
FIG. 9C is an explanatory diagram for explaining an image display in the case that the image area processed based upon the panning process operation and the tilting process operation of FIG. 9A is not disposed within the display area, but is pan/tilt-changed by the pan/tilt changing unit 4.

FIG. 9A is an explanatory diagram for explaining an image display in the case that an image area processed based upon the panning process operation and the tilting process operation of the terminal apparatus employed in the embodiment 2 of the present invention is disposed within a display area. FIG. 9B is an explanatory diagram for explaining an image display in the case that the image area processed based upon the panning process operation and the tilting process operation of FIG. 9A is not disposed within the display area. FIG. 9C is an explanatory diagram for explaining an image display in the case that the image area processed based upon the panning process operation and the tilting process operation of FIG. 9A is not disposed within the display area, but is pan/tilt changed by the pan/tilt changing unit 4a.

In FIG. 9A, symbol "A" shows an entire image imaged by the network camera 2, namely a display area which can be displayed by the network camera 2. In the embodiment 2, symbol "B" represents an image having resolution of 320× 240 pixels within the display area "A." While a center position of this image "B" corresponds to a central point "b" thereof, when a point "c" within the image "B" is designated by an input from the input unit 33 such as a mouse, the image "B" having the resolution of 320×240 pixels is moved to an image "C" where this point "c" is located as a center position. In the case of FIG. 9A, due to the panning operation and the tilting operation of the small range, a rotation of the pan/tilt changing unit 4a is not carried out. The rotation of the pan/tilt changing unit 4a is carried out as follows: That is, a position of the point "c" is calculated by the position calculator 41, and a judgement is made as to whether or not a rectangular area having a predetermined size where the point "c" is located at the center position is disposed within the range of the display area. If the rectangular area is disposed within at least the display area, then the pan/tilt changing unit 4a need not be rotated.

To the contrary, FIG. 9B represents such a case that the rectangular area is not disposed within the display area. Symbol "D" shows an image when the center position thereof is moved from the point "b" to another point "d", and represents such a case that an area "D*" is deviated from the display area. In this case, since the rectangular area is not disposed within the display area, data as to the area of "D*" cannot be acquired from the network camera 2, but becomes a partially no indication.

FIG. 9C indicates such a case that when the rectangular area of FIG. 9B is not disposed within the display area, the pan/tilt changing unit 4a is rotated. The display of FIG. 9C is different from the display of FIG. 9A, and indicates such a case that the panning operation and the tilting operation are carried out at a large angle. Symbol "E" shows a display area imaged when the pan/tilt changing unit 4a is rotated. The pan/tilt changing unit 4a is rotated by a drive motor (not shown) so as to rotate an optical axis of the imaging lens 4 to a predetermined direction. The user interface controller 34 judges as to whether or not the rotation of the pan/tilt changing unit 4a is required, and the image requesting unit 32a instructs the rotation of the pan/tile changing unit 4a, and also transmits a message for requiring an image after the rotation of the pan/tilt changing unit 4a. The received image data is displayed as such an image "D" that the point "d" is located at the center position in such a manner that image data of the area "D*" in FIG. 9B is acquired from the display area "E."

It should also be noted that in the embodiment 2, the panning operation and the tilting operation are carried out at an angle which is required to acquire the data as to the deviated area "D*." In the case of a display area "E" of FIG. 9C, only such a panning operation is carried out which is required in order to acquire the data as to the area "D*." When the above-explained panning operation and tilting operation are carried out, the operation of the pan/tilt changing unit 4a becomes a minimum operation. However, if there are greater possibilities that the rotation amount can be freely set and both the panning operation and the tilting operation are repeatedly performed, the following operation may be avoided. That is, the pan/tilt changing unit 4a is once rotated at a large angle, and a small-changing operation and an image acquisition are repeated, for instance, the point "d" is set to the center of the display area "E."

As previously explained, in accordance with the terminal apparatus 3 of the embodiment 2, the user interface controller 34 instructs the network camera 2 equipped with the panning function and the tilting function to move the display screen by way of the input from the input unit 33; if the image displayed on the display unit 35 is located within the display area of such an image imaged by the network camera 2 by the display unit 35, then the image displayed on the display unit 35 and the image continued to the displayed image are cut to be displayed. As a result, the terminal apparatus 3 can pretend to realize the pan/tilt imaging operations. Furthermore, in the case that the move instruction exceeds the display area of the imaged image, the image is panned/tilted by the pan/tile changing unit 4a. As a result, such an image of a wider range can be displayed.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

The present disclosure relates to the subject matter contained in Japanese patent application No. 2006-005909 (filed on Jan. 13, 2006), which is expressly incorporated herein by reference in its entirety.

What is claimed is:

1. A terminal apparatus connected to a network camera, the terminal apparatus comprising:
   a display configured to display a moving image, the moving image being captured by the network camera in a predetermined resolution;
   an input device configured to input an instruction for enlarging the moving image displayed on a screen of the display; and
   a controller configured to:
   enlarge, when the instruction is input via the input device, the moving image having the predetermined resolution at a magnification ratio corresponding to the instruction, and
   display the enlarged moving image on the display,
   switch, when the magnification ratio becomes larger than a predetermined magnification ratio, the display of the enlarged moving image to a display of a still image derived from the moving image having the predetermined resolution;
   obtain, while displaying the still image, the moving image having a higher resolution than the predetermined resolution from the network camera, and
   switch, after receiving the moving image having the higher resolution, the display of the still image to the display of the moving image having the higher resolution.

2. The terminal apparatus according to claim 1, wherein the still image is approximately the last frame of the moving image having the predetermined resolution.

3. The terminal apparatus according to claim 1, wherein the moving image comprises a plurality of still images.

4. The terminal apparatus according to claim 1, wherein, when the still image switches to the moving image having the higher resolution, the moving image having the higher resolution is enlarged at a magnification ratio of the still image.

5. A method for controlling a terminal apparatus connected to a network camera, the terminal apparatus configured to display a moving image, the moving image being captured by the network camera in a predetermined resolution, the terminal apparatus inputting an instruction for enlarging the moving image displayed on a screen of the display, the method comprising:
   enlarging, when the instruction is input, the moving image having the predetermined resolution at a magnification ratio corresponding to the instruction, and displaying the enlarged moving image on the display;
   switching, when the magnification ratio becomes larger than a predetermined magnification ratio, the display of the enlarged moving image to a display of a still image derived from the moving image having the predetermined resolution;
   obtaining, while displaying the still image, the moving image having a higher resolution than the predetermined resolution from the network camera; and
   switching, after receiving the moving image having the higher resolution, the display of the still image to the display of the moving image having the higher resolution.

6. The method according to claim 5, wherein the still image is approximately the last frame of the moving image having the predetermined resolution.

7. The method according to claim 5, wherein the moving image comprises a plurality of still images.

8. The method according to claim 5, wherein, when the still image switches to the moving image having the higher resolution, the moving image having the higher resolution is enlarged at a magnification ratio of the still image.

9. A non-transitory computer readable medium storing a computer program, the computer program installed in a terminal apparatus connected to a network camera, the computer program when executed by a processor, comprising:
   displaying a moving image, the moving image being captured by the network camera in a predetermined resolution;
   inputting an instruction to enlarge the moving image displayed on a screen of the display; and
   the computer program controlling a controller to:
   enlarge, when the instruction is input, the moving image having the predetermined resolution at a magnification ratio corresponding to the instruction, and display the enlarged moving image on the display,
   switch, when the magnification ratio becomes larger than a predetermined magnification ratio, the display of the enlarged moving image to a display of a still image derived from the moving image having the predetermined resolution;
   obtain, while displaying the still image, the moving image having a higher resolution than the predetermined resolution from the network camera, and
   switch, after receiving the moving image having the higher resolution, the display of the still image to the display of the moving image having the higher resolution.

10. The method according to claim 9, wherein the still image is approximately the last frame of the moving image having the predetermined resolution.

11. The method according to claim 9, wherein the moving image comprises a plurality of still images.

12. The method according to claim 9, wherein, when the still image switches to the moving image having the higher resolution, the moving image having the higher resolution is enlarged at a magnification ratio of the still image.

* * * * *